United States Patent [19]

Maehara et al.

[11] Patent Number: 5,390,055
[45] Date of Patent: Feb. 14, 1995

[54] LOADING SYSTEM FOR TAPE CASSETTE IN RECORDING AND/OR REPRODUCING APPARATUS FOR STORING AND/OR REPRODUCING INFORMATION ON RECORDING MEDIUM TAPE STORED IN CASSETTE HOUSING

[75] Inventors: Masanori Maehara; Eiji Ohshima; Toshio Mamiya; Yoshio Kusui, all of Kanagawa, Japan

[73] Assignee: Sony Corporation, Japan

[21] Appl. No.: 100,199

[22] Filed: Aug. 2, 1993

Related U.S. Application Data

[63] Continuation of Ser. No. 744,838, Aug. 13, 1991, abandoned, which is a continuation of Ser. No. 268,795, Nov. 9, 1988, abandoned.

[51] Int. Cl.⁶ .............................................. G11B 5/027
[52] U.S. Cl. ........................... 360/85; 360/96.5; 360/96.6
[58] Field of Search ............... 360/84, 85, 96.5, 96.6

[56] References Cited

U.S. PATENT DOCUMENTS

| | | | |
|---|---|---|---|
| 3,692,257 | 9/1972 | Righi | 360/96.6 X |
| 4,633,353 | 12/1986 | Komatsu | 360/96.6 X |
| 4,641,210 | 2/1987 | Ohyama | 360/96.6 X |
| 4,661,865 | 4/1987 | Ida et al. | 360/96.6 |
| 4,757,400 | 7/1988 | Park | 360/96.5 |

FOREIGN PATENT DOCUMENTS 0149857  6/1988  Japan ................. 360/96.5

Primary Examiner—Andrew L. Sniezek
Attorney, Agent, or Firm—Ronald P. Kananen

[57] ABSTRACT

A cassette tape cassette loading system is provided with a tape cassette holder which is movable between a first position in which the tape can be withdrawn from the tape cassette and disposed in a tape path including a record replay head and a second position in which the cassette can be removed or inserted into the holder. A detent mechanism is provided for cooperation with a cam formed integrally with the cassette holder to define an intermediate position between the first and second positions of the holder at which intermediate position the cassette cannot accidentally be caused to fall out of the tape cassette loading system and be damaged. When the tape cassette is to be removed from the tape cassette loading system, the holder is manually actuated to the second or fully open position and the tape is removed manually. With this constriction, the need for a heavy cassette holder damping unit is eliminated.

21 Claims, 9 Drawing Sheets

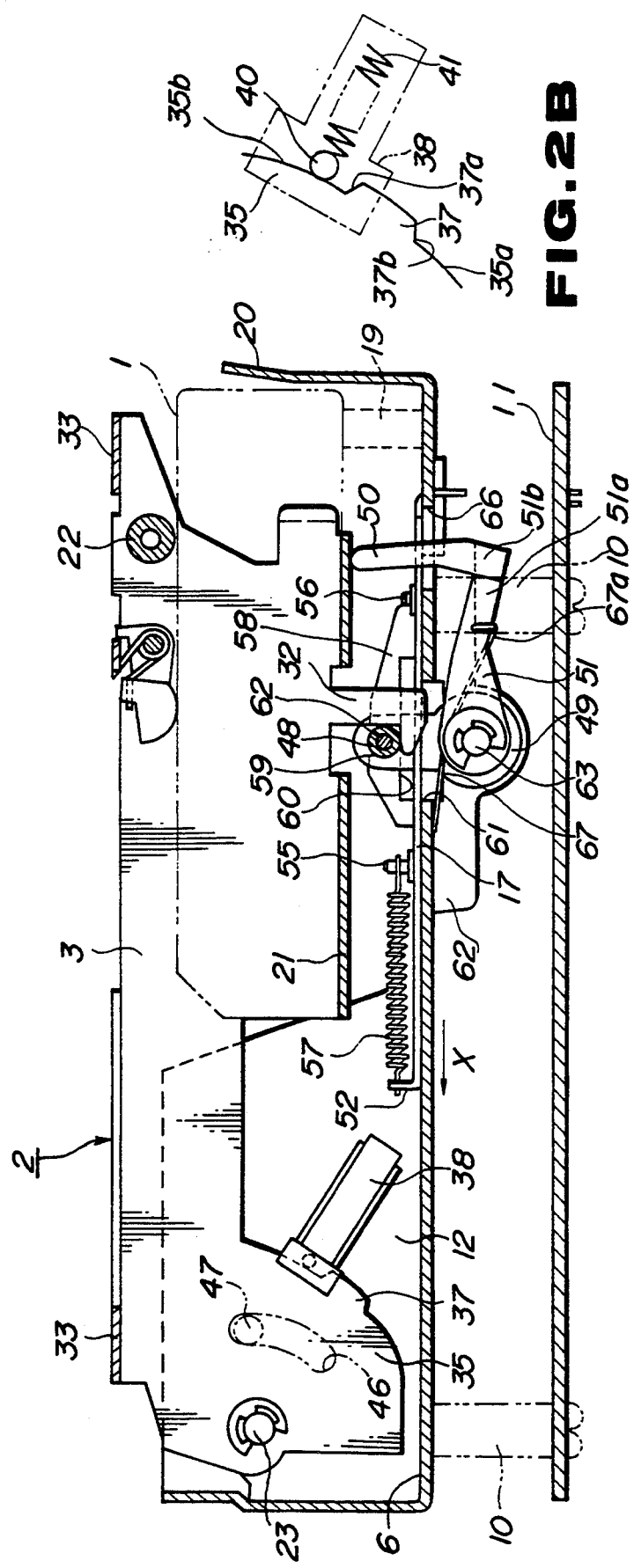

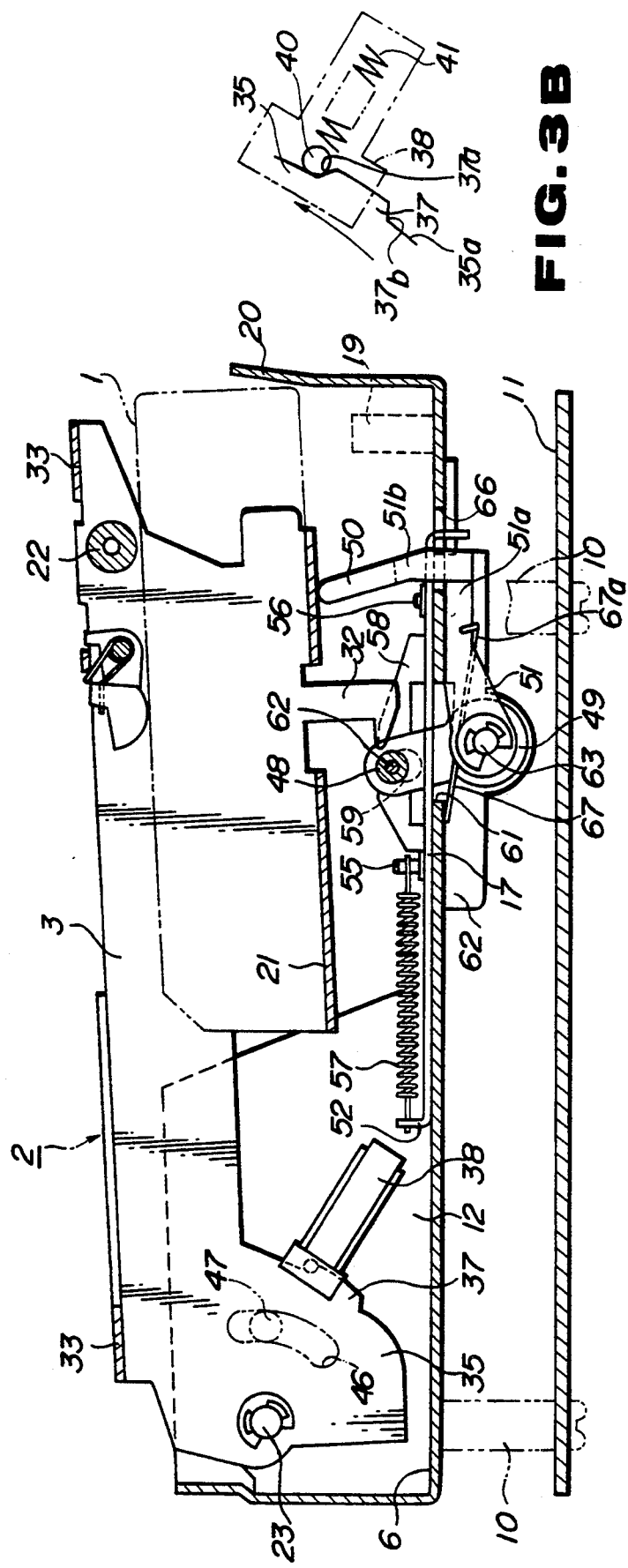

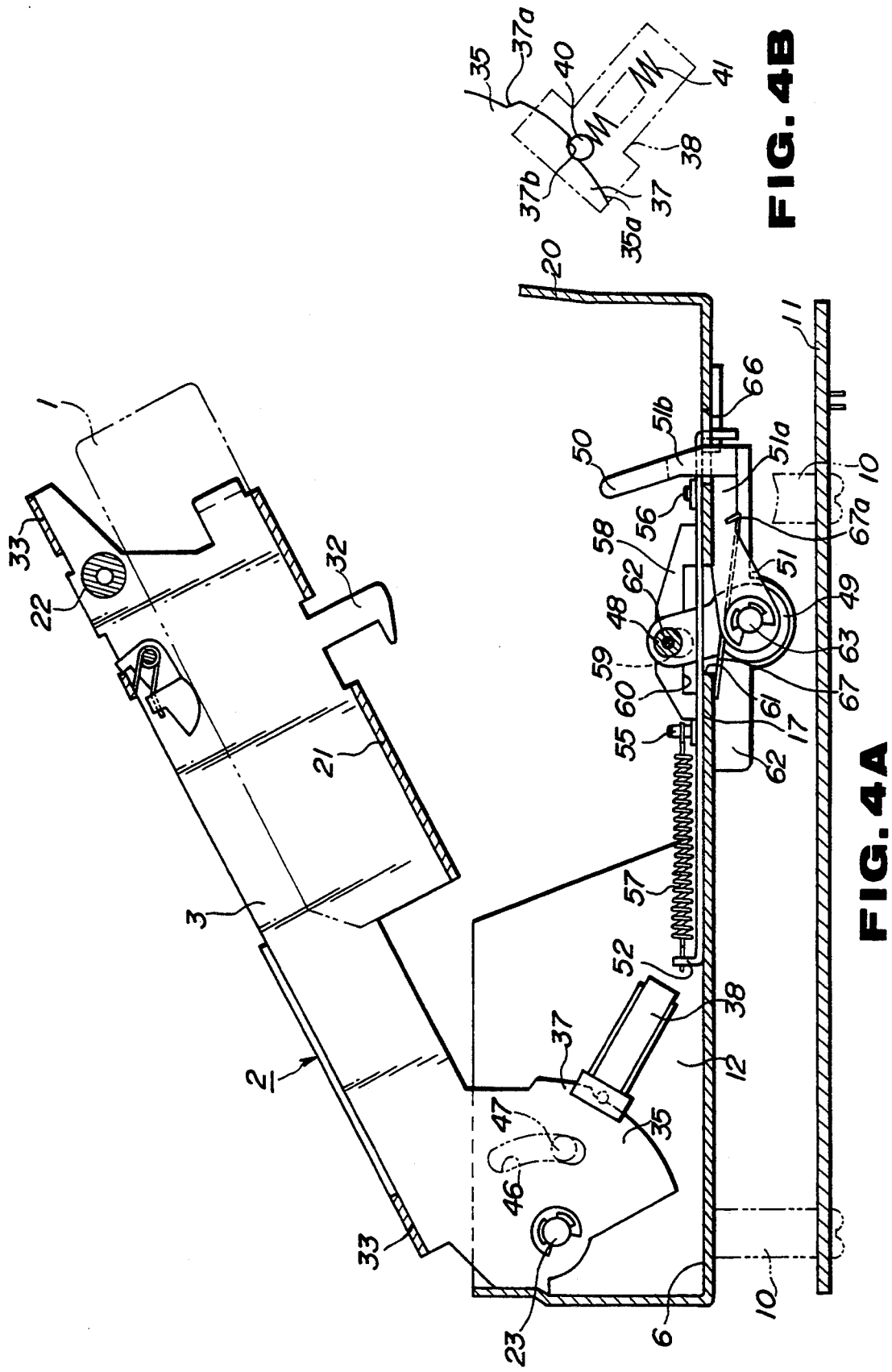

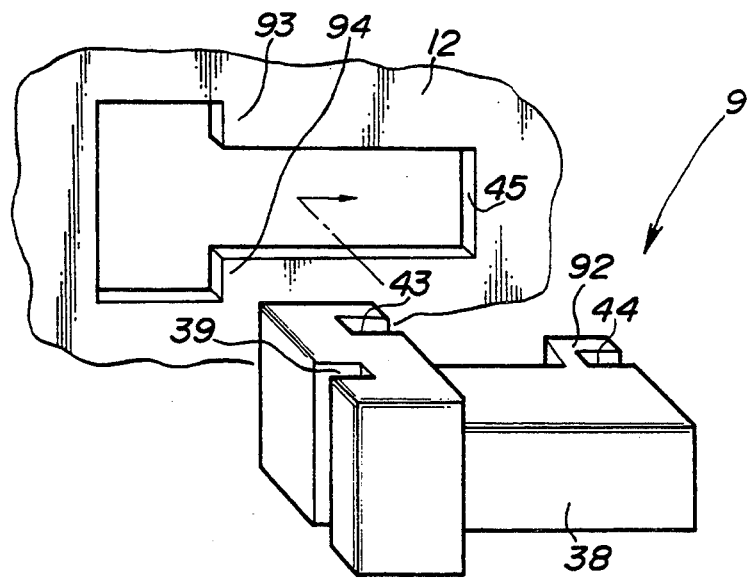
FIG. 5A
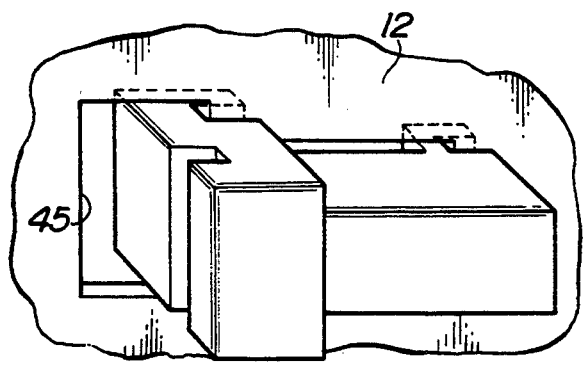
FIG. 5B
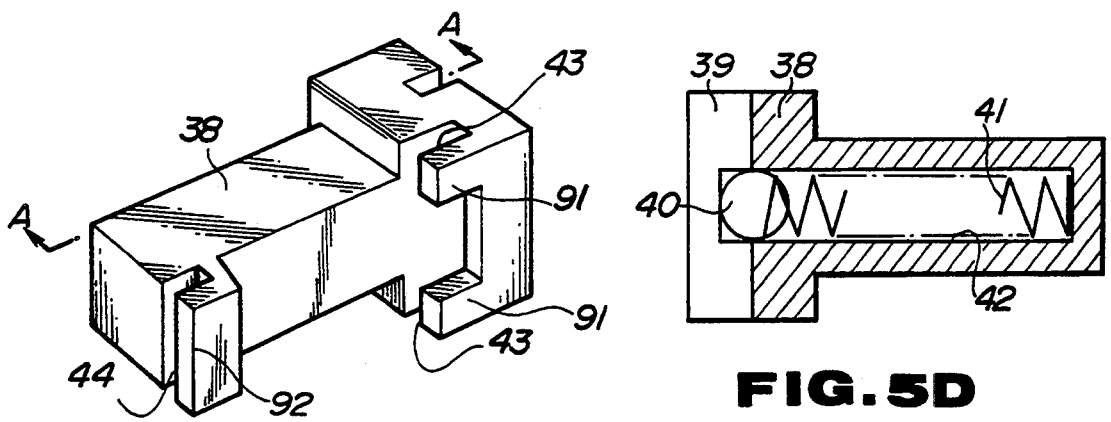
FIG. 5C  FIG. 5D

LOADING SYSTEM FOR TAPE CASSETTE IN RECORDING AND/OR REPRODUCING APPARATUS FOR STORING AND/OR REPRODUCING INFORMATION ON RECORDING MEDIUM TAPE STORED IN CASSETTE HOUSING

This application is a continuation, of application Ser. No. 07/744,838, filed Aug. 13, 1991, which was a continuation of Ser. No. 07/268,795, filed Nov. 9, 1988, both now abandoned.

BACKGROUND OF THE INVENTION

1. Field of the Invention

The present invention relates generally to a cassette tape recording and/or reproducing apparatus, such as an audio tape recorder, a video tape recorder, and so forth. More specifically, the invention relates to a loading system for handling a tape cassette between a loading position, at which a tape as recording medium and stored in a cassette or cartrige housing, is accessible for recording and reproducing information thereon, and an unloading or eject position, at which the tape cassette is accessible for setting in or removing from the recording and/or reproducing apparatus. Further particularly, the invention relates to a tape cassette loading system for a recording and/or producing apparatus having a so-called pop-up architecture in loading and unloading or ejecting the tape cassette.

2. Description of the Background Art

In certain types of cassette tape recording and/or reproducing apparatus, a recording medium tape, such as a magnetic tape, is pulled out from a cassette housing and disposed in a tape path defined outside of the cassette casing. For example, this is required in a recording and/reproducing apparatus employing a rotary head. In such case, the tape pulled from the cassette housing is wrapped around a rotary head drum by means of tape guides. When the tape cassette in such recording and/or reproducing apparatus is to be unloaded and to be removed from the apparatus, the tape in the tape path has to be retracted within the cassette housing before the tape cassette is removed from the apparatus.

On the other hand, for convenience of setting and removing the tape cassette in and from the recording and/reproducing apparatus, some apparatus have a so-called pop-up architecture for automatically moving a cassette holder between the loading position and an unloading or eject position, at which the cassette holder is fully projected from the housing of the recording and/or reproducing apparatus so that the tape cassette may be easily removed or set. Such recording and/or reproducing apparatus with the pop-up type tape loading system is convenient for setting and removing the tape cassette. On the other hand, such pop-up architecture requires a spring means for biasing the cassette holder to the eject position and a damper means for restricting motion speed of the cassette holder. This damper means is generally too bulky to allow the recording and/reproducing apparatus to be compact enough, which compactness of the overall structure of the recording and/or reproducing apparatus is an important factor in certain types of apparatus, such as hand-carried VTR cameras, portable audio tape replayers and so forth.

Therefore, for achieving satisfactory compactness, there is a manually operable cassette loading system, in which the cassette holder is manually operated between the loading position and an unloading or eject position, which has been proposed. Though the manually operable cassette loading system is advantageous in view of simplification of construction of the tape loading mechanism and thus achieves satisfactory compactness and light-weight, a drawback is encountered in difficulty in telling the operator the timing at which the unloading of tape to retract the tape within the tape cassette is completed. This causes a tendency that the operator manually operates the cassette holder before completing the tape unloading operation. Since some portion of the tape is maintained within the tape path before the tape unloading is completed, such manual operation of the cassette holder causes damage to the components of the recording and/or reproducing apparatus, or to unintentionally pull out a substantial length of the tape from the tape cassette.

SUMMARY OF THE INVENTION

It is one of the objects of the instant invention to provide a tape drive mechanism which is well-suited for use in portable cassette tape record and replay devices in which the possibility of the tape accidentally dropping out of the holder when the tape eject button is actuated is eliminated.

It is another object of the instant invention to eliminate the necessity, encountered in prior art devices, of providing a heavy damping mechanism for restricting the rate at which the holder moves to the eject position.

It is yet another object of the present invention to provide a tape drive mechanism wherein means are provided for letting the user know when the tape is in such condition that it may be safely removed from the tape drive and thereby avoid damage to the tape drive mechanism and/or the magnetic tape due to premature attempts to remove the tape from the tape drive.

The above objects and others are achieved with a tape drive equipped with a tape cassette holder according to the present invention, by providing on the tape drive mechanism an indication means for letting the user know when he may safely remove the tape from the tape cassette holder of the tape drive mechanism.

According to one aspect of the tape access door and holder according to the instant invention, locking means are provided for holding the cassette holder in a closed condition until the tape cassette is ready for removal.

According to another aspect of the instant invention a detent mechanism is provided on one of the holder and/or the body of the cassette tape drive mechanism for cooperation with a cam face provided on the other of said holder and said body, said detent mechanism cooperating with said guide face to define an intermediate holder position wherein the holder is opened enough to allow a portion of the holder to be grasped and opened still further manually, but is not opened enough to allow removal of said tape.

According to another aspect of the instant invention, an elastic ejector spring means is provided having sufficient force for driving said holder from a closed position to said intermediate position, after which said tape is in such condition to be removed from the tape drive mechanism and the eject switch of said tape mechanism has been actuated, but having insufficient force to overcome said cooperation between said detent mechanism and said cam face to drive said holder beyond said intermediate position. The holder, once actuated to its intermediate position, can thereafter be manually manipulated so as to overcome the elastic engagement between the detent mechanism and the cam face and be actuated to a position at which the tape can be removed thus eliminating the hazard, encountered in the prior art devices, of having the tape fall out when the holder opens unexpectedly.

The partial opening of the holder may serve as the indicator to the user that the tape is ready for removal in addition to or alternatively to which an indicator light may be provided to signal when the tape is ready for removal.

In addition, it may be noted that the holder may be formed in such manner that until it is partially open, it is not possible for the user to get a good enough grip on it manually to open it, thus effectively discouraging the user from attempting to open the holder prematurely.

According to a further aspect of the invention, a tape cassette loading system comprises a movable cassette holder associated with a movable tape guide means for drawing a section of a tape from a tape cassette received in the tape cassette holder and arranging it in a determined tape path defined outside of a cassette casing when the cassette holder is placed at a first posiition in which the tape guide means is accessible to the tape stored in the cassette casing, the cassette holder being movable between the first position and a second position at which the tape cassette can be set in or removed from the cassette holder, via a third position oriented between the first and second positions, retaining means for movably retaining the cassette holder for movement between the first, second and third positions, a cam defined on one of the tape cassette holder and the stationary chassis and a cam follower defined on the other of the holder and stationary chassis, an elastic pusher means for urging the cassette holder from the first position in the direction of the second position, and a cam means, defined on one of the tape cassette holder and the stationary chassis and for follower means defined on the other of the holder and stationary chassis, for limiting movement of the cassette holder for stopping at the third position in the way from the first position to the second position.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 2a is a cutaway side elevation of the preferred embodiment of the tape cassette loading system shown in FIG. 1, with the holder in the fully closed or "tape loading" position;

FIG. 2b illustrates the relationship between the detent mechanism and the cam in the holder position shown in FIG. 2a;

FIG. 3a is a cutaway side elevation of the preferred embodiment of the tape cassette loading system shown in FIGS. 1 and 2, with the cassette holder in the partially open position;

FIG. 3b illustrates the relationship between the detent mechanism and the cam in the holder position shown in FIG. 3a;

FIG. 4a is a cutaway side elevation of the apparatus shown in FIGS. 1, 2 and 3 with the holder in the fully open position;

FIG. 4b illustrates the relationship between the detent mechanism and the cam in the holder position shown in FIG. 4a;

FIGS. 5A to 5D are perspective views showing the cam follower ball or detent mechanism housing employed in the above embodiments of the invention and the manner in which it is mounted on the chassis of the cassette drive chassis;

DESCRIPTION OF THE PREFERRED EMBODIMENT

Figure 1:
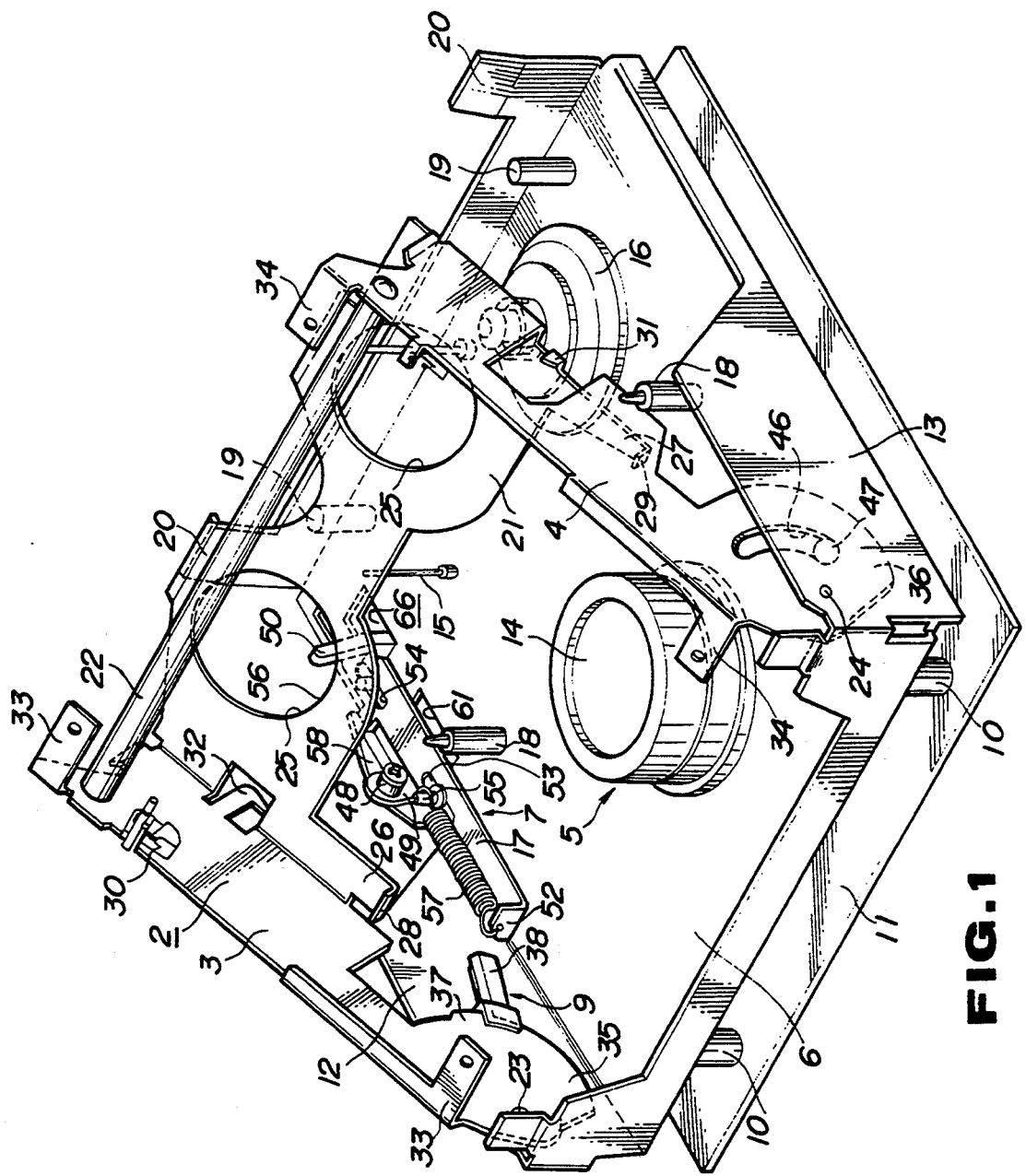
FIG. 1 is a perspective view of the principle section of a VTR system employing the preferred embodiment of a tape cassette loading system with working elements for retaining a tape cassette, in which a cassette holder in the tape cassette loading system is illustrated in the fully open position.

The preferred embodiment of a tape cassette loading system in a recording and/or reproducing apparatus will be discussed herebelow in terms of a video tape recorder (VTR), such as 8 mm VTR for recording and reproducing information. Though the discussion concerning the preferred embodiment of the tape cassette loading system will be concentrated in a form applied to VTR, the same or similar system will be applicable for audio tape recorder, such as a pulse-code modulated (PCM) audio recorder, a digital audio recorder and so forth.

An example of a tape cassette loading system comprising a movable tape cassette holder according to the preferred embodiment of the instant invention, which cassette holder will be generally represented by the reference numeral 2 in the following discussion, will be described hereinafter with reference to the FIGS. 1 to 4 from which the outer casing and moving tape guides have been omitted to allow a clearer view of the details of the parts defining the essential features of the instant invention.

The VTR system employing the preferred embodiment of the tape cassette loading system, includes a base plate 11 on which a mechanical chassis is supported. The mechanical chassis has a bottom plate 6 supported by means of dowel connectors 10 in such a manner that a space is defined between the lower face of the bottom plate 6 and the base plate 11. A rotary head unit 5 is mounted on the bottom plate 6 of the mechanical chassis. As is well known, the rotary head unit 5 comprises a rotary tape head 14, a cassette locator posts 18 projecting upwards from the bottom plate 6 of the mechanical chassis designed to be received in locator holes formed in the bottom of the tape cassette 1 so as to precisely align the tape cassette casing relative to a tape reel base 16 which is also provided on the bottom plate 6 of the mechanical chassis for rotationally driving a reel of the tape cassette 1, and locator posts 19 projecting upwards from the bottom plate 6, the ends of which abut the lower surface of a tape cassette casing while the cassette casing is in the tape loading position thereby precisely defining the distance between the lower surface of the tape cassette casing and the base plate 6.

At the front of the base plate 6 are formed upwardly protruding tabs 20 which engage with the outward facing side surface of the cassette tape casing to prevent it from aligning out of the tape drive apparatus while the cassette holder 2 is in a partially open state which will be described in detail later in this disclosure. At either side of the base plate 6 are formed side plates 12 and 13.

On the side plates 12 and 13 is supported, by means of pivots 23 and 24, the cassette holder 2 which in the exemplarity depicted device is formed from pressed sheet metal. The cassette holder 2 is supported by the pivots 23 so as to be operable between a fully open and a fully closed position as will be disclosed in greater detail later in this disclosure. The fully open position of the cassette holder 2 will be hereafter referred to as an "eject position". Similarly, the fully closed position of the cassette holder 2 will be hereafter referred to as a "tape loading position". Upon setting the tape cassette 1 in the loading position, the tape cassette is inserted in the cassette holder 2 while the cassette holder is in the eject position. Then, the cassette holder 2 is manually depressed toward the tape loading position. Immediately after, completing movement from the eject position to the tape loading position, a tape loading mechanism which operates to wrap the tape onto the rotary head. On the other hand, during a tape cassette ejecting operation, the cassette holder 2 is shifted from the tape loading position to a position slightly shifted from the tape loading position toward the eject position, at which the cassette holder 2 is slightly projected from the outer casing of the VTR unit. The cassette holder 2 is shifted to this position immediately after unloading of the tape for fully retracting the tape within the tape cassette casing, is completed. This position will be hereafter referred to as "tape unloading completed position".

The cassette holder 2 comprises a lower cassette support plate 21 in which are formed a pair of holes 25 through which the driving pins of reel bases 16 may protrude into the reel hubs of the cassette spools in the tape cassette 1 when the tape cassette is in the tape loading position.

The initial position of the tape cassette 1 within the cassette holder 2 is defined in the lateral directions by side walls 3 and 4 of the cassette holder 2 and in the rearmost position by stopper tabs 28 and 29 provided on extensions 26 and 27 formed on the bottom plate 21 of the cassette holder 2.

A locator cross-bar 22 is disposed so as to cross between the side walls 3 and 4 at the upper portion of the cassette holder 2 near the mouth of the cassette holder for guiding the tape cassette 1 as it is inserted into the cassette holder and a pair of spring loaded members 30 are provided in the upper portion at either side of the cassette holder 2 for elastically urging the tape cassette 1 downward against the bottom 21 of the cassette holder 2 so that the tape is firmly retained in the cassette holder 2 once inserted thereinto and cannot easily be caused to vibrate. Tabs 33 and 34 are provided at the upper side of the holder onto which a door facing or dust cover (not shown) may be attached.

Projecting downward from the side plate 3 of the tape cassette holder 2 is a locking lever 32 for cooperating with a locking roller 48 to hold the cassette holder 2 in a tape loading position as will be set out later in more detail.

A lock release assembly 7 is provided on the bottom plate 6 of the mechanical chassis, and includes a lock releasing arm 59, on which the lock roller 48 is supported.

The lock release assembly 7 further includes a slider 17 in which a pair of elongated guide slots 53 and 54 are formed and through which protrude a pair of guide pins 55 and 56 which are rigidly attached to the plate 6 and which cooperate with the slot 53 and 54 to define the limits of the travel path of the slider member 17. The length of said travel path being defined by the length of said slots 53 and 54 and the direction of travel is also limited to the forward and backward directions due to the axial orientation of the slots. The pin 55 protrudes upward above the top surface of the slider member 17 and retains the end of a spring 57, the other end of which is attached to an upwardly protruding tab 52 formed on the end of the slider member 17. The tension of the spring 57 thus arranged serves to draw the slider member 17 in the forward direction relative to the base plate 6 of the mechanical chassis.

The slider member 17 comprises an upturned portion 58 at the side thereof with an engaging hole 59 which is not clearly illustrated, but the numeral and general location of which is shown in FIG. 3a. A pin 63 is provided on the opposite side of the arm 49 from that on which the roller 48 is supported, which pin protrudes into the hole 59 in the slider member 17 so that the arm 49 is coupled to the slider member 17. Thus the tension of the spring 57 serves to drive the pin 63 in the direction of the front of the tape drive unit indicated by the arrow x in FIG. 2. Therefore, the roller 48 is normally biased into the locking lever 32 so that the cassette holder 2 is held by the locking lever in the tape loading position.

Although not shown in the drawings, the tape drive mechanism also comprises automatic moving tape guides which are supported on the bottom plate 6 of the chassis and are operable for drawing a section of the magnetic tape in the tape cassette 1 out therefrom and arranging it in a tape path in which a portion of the magnetic tape is wound around the rotary head drum 14 so that a signal may be read from or recorded onto the magnetic tape by the heads of the rotary head drum.

As has been mentioned previously in this document while the tape in the tape cassette 1 is in a condition wherein a section of the tape has been drawn out of the cassette casing and wrapped around the rotary head drum 14, it is essential that no attempt is made to remove the tape cassette from the tape drive unit.

Therefore, when the tape cassette 1 is disposed within the cassette holder 2 and a section of the tape has been arranged in the predetermined tape path, as described above, and the tape eject button of the tape cassette drive apparatus is actuated, the tape is returned to the reels of the tape cassette 1 by means of the moving tape guides and by driving the reels of the tape cassette so as take up the portion of the tape that was arranged in the tape path. When a state is achieved in which the tape is determined to be safely disposed within the tape cassette, a signal is outputted to actuate an actuation means (not shown) to overcome the tension of the spring 57 and drive the sliding member 17 in the direction indicated by the arrow X in FIG. 2a. By this sliding movement, the pin 63 on the arm 49, at the opposite side thereof from the roller 48, engages with the hole 59 in the upwardly protruding section 58 of the slider member 17 so as to swing the arm 49 in a rearward direction and disengage the roller 48 from the locking lever 32. A pusher 50 which is pivotably attached to the chassis 11 of the tape drive mechanism is biased against a lower surface 21 of the cassette holder 2 by an arm 67a of a torsion spring 67. Thus the pressure exerted on the lower surface 21 of the cassette holder 2 causes the cassette holder to be urged toward the eject position.

The cassette holder 2 pivots about pivot members 23 and 24 toward the eject position. A radiused cam 35 is defined on a portion of a side wall 3 of the cassette holder 2. The center of the radius of the cam faces 35a and 35b is defined at a point that is essentially near or at the pivoting axis of pivot 23 of the cassette cassette holder 2. The cam 35 comprises a raised step portion 37 at either side of which are defined a first inclined cam face 37a and a second inclined cam face 37b.

A "detent" or "cam follower" unit 9 is so provided as to be mounted in a slot 45 formed in a side wall 12 of the mechanical chassis of the tape cassette loading system. The detent unit 9 comprises a ball 40 housed in a cylindrical shaft 42 in a housing 38 along with a spring 41 by which the ball is urged into engagement with the cam 35.

When the latch engaging roller 48 is released from engagement with the locking lever 32 as mentioned above, the cassette holder 2 is urged to rotate about the pivot 23 by the pusher 50. When the cassette holder 2 reaches the position shown in FIG. 3, the ball 40 comes into engagement with the leading portion 37a of the raised step 37 of the cam 35 and by this engagement therewith further rotation of the cassette holder 2 due to the urging of the spring 67 transmitted via the pusher 50 is arrested.

Thus it will be appreciated that the net effect of the above cooperations is that when the eject button of the tape drive is actuated the cassette holder 2 becomes actuated to the partially open tape unloading completed position shown in FIG. 3 where it remains.

It will further be appreciated that the engagement of the pusher ball 40 with the inclined leading edge of the step 37a serves to elastically restrict the cassette holder 2 from opening further and that the pusher 50, on the other hand serves, to elastically prevent the cassette holder from closing.

While the cassette holder 2 is in this tape unloading completed position shown in FIG. 3, it can be appreciated that the tape cannot be removed or fall out of the cassette holder 2 because it is retained therein by a front wall portion 20 of the chassis of the cassette player mechanism, by which the front limit of the tape cassette 1 receiving portion within the cassette drive mechanism is defined, therefore there is no danger that the tape may accidentally fall out of the tape mechanism and be damaged.

When the tape cassette 1 is to be removed from the cassette holder 2, this may be achieved by manually actuating the cassette holder to pivot toward the fully open position shown in FIG. 4. An outward pivoting force exerted manually on the cassette holder 2 causes the inclined leading edge 37a of the step 37 of the cam face to exert pressure on the ball 40 in the direction opposite that of the engaging pressure exerted on the ball 40 by the spring 41 and thus overcome the outward rotation restricting engagement between the ball 40 and the inclined edge 37a so that the holder can be manually actuated to the position shown in FIG. 4a in which position the tape cassette may removed from or inserted into the holder 2.

The cam 35 comprises a second inclined portion 37b against which the ball 40 is urged while the door is in the fully open eject position as seen in FIGS. 4a and 4b. As can be seen from FIG. 4a, and from FIG. 4b which is an enlarged schematic view showing the relation of the ball to the cam while the cassette holder 2 is in the fully open position, the engagement between the ball 40 and the inclined face 37b of the step 37 of the cam 35 provides essentially the opposite function served by that of the engagement between the ball 40 and the inclined portion 37a while the cassette holder 2 is in the partially open position, that is, while the cassette holder 2 is in the fully open eject position shown in FIG. 4 the engagement between the ball 40 and the inclined cam face 37b serves to elastically prevent the cassette holder from closing, or in other words, this engagement serves to keep the cassette holder in the open position. It will be appreciated that inward pressure manually exerted on the cassette holder can drive the ball 40 inwards against the outward urging force of the spring 41 thereby allowing the ball to ride over the step 37 of the cam 35, and allowing the cassette holder to be manually actuated into the tape loading position.

It will be noted here that in the depicted embodiment, a curved slot 46 is provided in a downwardly protruding section 36 of the side wall 4 of the cassette holder 2, the center of the radius of curvature of which is the pivoting axis of the cassette holder 2. A stopper member 47 is rigidly secured on an upright side wall 13 of the chassis and protrudes into the slot 46 in the side wall 4a of the holder 2. The extreme rotational limits of the cassette holder 2 about the pivots 23 and 24 are defined at the rotational positions of the cassette holder 2 at which the stopper 47 comes into contact with the ends of the slot.

Thus with the above embodiment of the cassette holder unit, it will be appreciated that the need for a damper unit encountered with prior art pop-up type cassette holders is effectively dispensed with by the provision of the light cam and ball bearing cam follower unit of the present invention. It will also be noted that since the distance which the cassette holder is driven open by the pusher 50 is short, therefore the holder does not have time to build up much speed in the short distance between the fully closed position and the partially open position at which its opening movement is arrested by the engagement between the leading edge of the step in the cam and the cam follower ball of the detent unit 9. Therefore, the movement can be arrested without undue stress on the pivots of the holder and without causing a great deal of jerking of the tape drive unit.

From FIGS. 5a to 5d the details of construction of the detent unit 9 can be appreciated.

As can be seen from the drawings, the construction of the detent unit is exceedingly simple and efficient, and accommodates an easy assembly of the unit into the support structure of the tape drive unit into which it is to be received.

As can be seen in FIGS. 5a and 5c the outer casing 38 of the detent unit 9 comprises a pair of slots 43 and 44 defined by protruding hooks 91 and 92 to cooperate with a generally key-hole shaped hole 45 formed in the wall 12 to retain the unit 9 thereon.

As can be seen, the casing 38 of the unit 9 comprises a larger block shape section and a narrower block shaped section and the profile of the holder 45 reflects this. With this configuration, it is only necessary to form one receiving hole on the wall 12 to cooperate with both of the hooks 91 and 92 even though both of the slots 43 and 44 face the same direction, this is because the width of the hook tab 91 is greater than the narrower portion of the hole 12 and therefor the hook tab 91 can cooperate with the shoulders 93 and 94 defined by the transition between the wider and narrower sections of the hole 45.

Thus when the unit 9 is installed as shown in FIG. 5b it becomes effectively retained within the hole 12 without the use of any external fasteners, thus facilitating a quick easy assembly.

The detent unit casing 38 comprises a slot 39 at its large end which receives the edge of the previously mentioned cam 35 on which the cam faces 35a, 35b and the step 37 are formed and, as can be seen in FIG. 5d which is a cutaway view exposing the interior of the cam unit, the cam unit comprises a shaft 42 in which a ball-bearing 40 and a compression spring 41 which urges the ball 40 outward from the shaft 42 into the slot 39 and therefore against the cam faces of the cam which protrudes into the slot.

It will be noted that the pressure of the ball bearing against the cam 35 serves to hold the slots of the detent unit in engagement with the walls of the hole thus retaining the detent unit 9 in place in the slot 45.

Thus the detent unit 9 according to the instant invention is very simple in construction and can be pre-assembled before being mounted onto the wall of the tape drive unit on which it is to be retained thus facilitating easy assembly at every step. A simple light weight cassette holder eject mechanism for a portable tape drive unit such as that mounted on a portable video camera or a DAT unit is provided in which the necessity encountered in the prior art for a complicated and heavy damping unit is overcome and in which the danger of accidentally dropping the tape cassette from the unit when the cassette holder opens unexpectedly and the danger of removing the tape cassette before the magnetic tape has been returned thereinto are eliminated.

Figure 6:
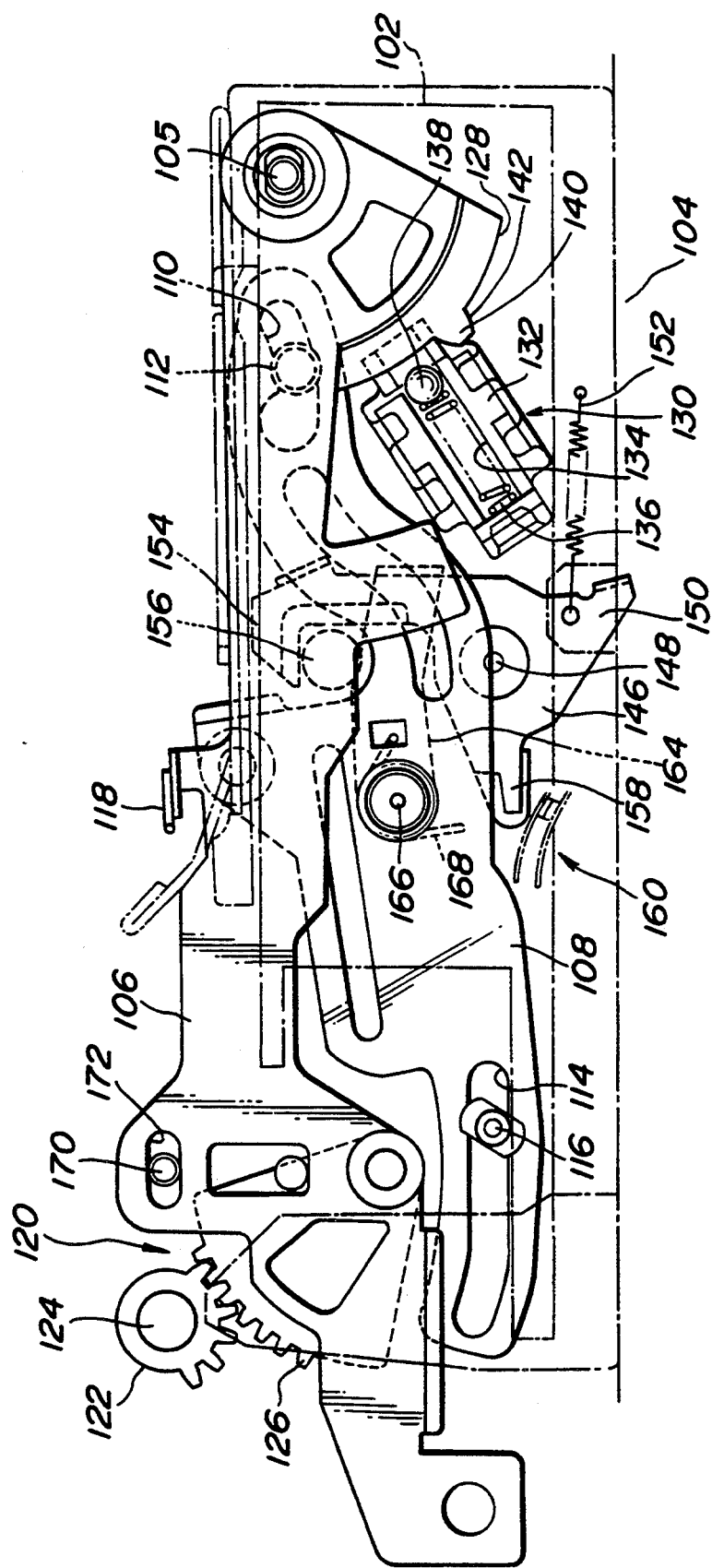
FIG. 6 is a fragmetary side elevation of another embodiment of a tape cassette loading system, according to the present invention, in which a cassette holder is placed at a tape loading position.

FIG. 6 shows another embodiment of the pop-up type cassette holder, according to the present invention. In this embodiment, a cassette holder 102 is shifted among the fully open eject position, the fully closed tape loading position and the partly open tape unloading completed position while maintaining paralleism with the bottom plate 104 of the mechanical chassis. As seen from FIG. 6, the shown embodiment of the tape cassette loading system includes an actuation lever 106 which is pivotally mounted on the upper front corner of side wall of the mechanical chassis (not shown) for pivotal movement about a pivot 105 according to movement of the cassette holder. The actuation lever 106 extends rearwardly along the side wall of the mechanical chassis. The tape cassette loading system further comprises a connecting lever 108 which defines an elongated arc shaped opening 110 through the front end portion thereof. To the arc shaped opening 110, a connecting pin 112 extending laterally from the side wall of the cassette holder 102 is slidably engaged. Another elongated arc-shaped opening 114 is formed through the rear end portion of the connecting lever 108. The arc-shaped opening 114 is engaged with a guide pin 116 extending from the side wall of the mechanical chassis. Furthermore, the connecting lever 108 is coupled with the actuation lever 106 via a pivot pin 118. Therefore, the cassette holder 102 is connected to the actuation lever 106 via the connecting lever 108 so as to transfer the pivotal force exerted on the actuation lever 106 by a torsion spring 118 for causing a shift in relation to the base plate 104 of the mechanical chassis.

It should be noted that, another set of the actuation lever and the connecting lever are provided on the other side of the cassette holder. For synchronously operating the actuation lever of the other side, a synchronous drive mechanism is provided which is generally represented by the reference numeral 120. The synchronous drive mechanism 120 comprises a gear member 122 which is rigidly fixed onto one end of a cross bar member 124 for rotation therewith. The identical gear member is rigidly secured onto the other end of the cross bar member 124. The gear member 122 meshes with a fan-shaped pivotal actuation gear member 126 which is rigidly secured onto the rear portion of the actuation lever 106. With this construction, the actuation gear member 126 is pivotally driven according to pivotal movement of the actuation lever 106 to drive the gear member 122. The rotational force transferred to the cross bar member 124 via the gear member 122 drives the other side gear member. The gear member on the other side drives a driven gear member which is secured on the actuation lever on the other side for synchronous pivotal movement of the latter.

As seen from FIG. 6, the actuation lever 106 has a front end portion which is formed into an essentially fan-shaped configuration. A cam face 128 is defined in opposition to a spring-operated cam follower unit 130. The cam follower 130 includes a housing 132 defining an axially-extending space 134. A compression spring 136 is disposed within the space 134 and biases a ball-shaped cam follower member 138. The cam follower member 138 is normally biased toward the cam face 128 to maintain resilient contact therebetween.

A projection 140 with tapered sides 142 and 144 is projected from the cam face 128. This projection 140 is oriented at a position defining the angular position of the actuation lever 106 at the tape unloading completed position, as shifted from the eject position to the tape unloading completed position. The projection 140 is coupled with the cam follower member 138 to stop pivotal movement of the actuation lever 106 at the angular position corresponding to the tape unloading completed position.

A pivotal locking lever 146 is mounted on the side wall of the mechanical chassis by means of a pivot pin 148. The locking lever 146 has a lower portion 150, to which one end of a tension spring 152 is engaged. The other end of the tension spring 152 is connected to the side wall of the mechanical chassis. The tension spring 152 normally exerts a resilient force to the locking lever 146 in a locking direction. The locking lever 146 has a locking hook 154 at the upper portion, which locking hook engages with a locking roller 156 supported on the cassette holder 102. The locking hook 154 has a tapered edge 155. The locking lever 146 is further provided with a transversely extending section 158. The free end of the transversely extending section 158 normally mates with a limit switch 160 which is constantly biased to open the switch. The locking lever 146 is coupled with a torsion spring biased member 164. The spring biased member 164 is pivotably mounted on the side wall of the mechanical chassis about a pivot 166. The spring biased member 164 is constantly biased in a direction toward the locking roller 156 by means of a torsion spring 168.

In the tape loading position shown in FIG. 6, the spring biased member 164 causes further rotational movement of the locking lever 146 to grip the locking roller 156 between the edge thereof and the locking hook 154 in order to retain the cassette holder 102 at the tape loading position. At this position, the transversely extending section 158 depresses a resilient switch element of the limit switch 160 which serves as a detector detecting the cassette holder 102 shifted into the tape loading position. When the switch 160 is closed, the tape loading mechanism is enabled to operate to wrap the tape onto the rotary head drum (not shown in this embodiment).

Figure 7:
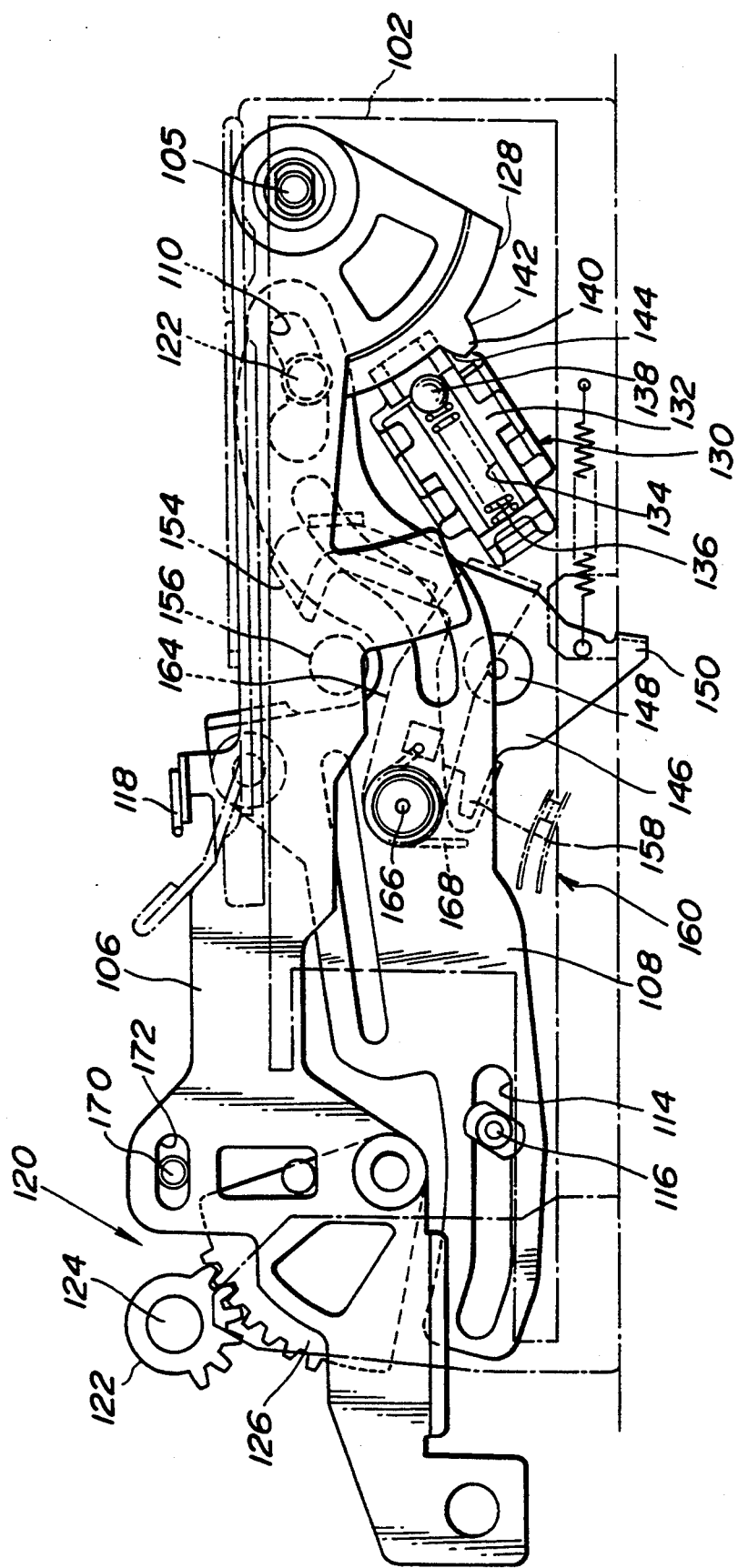
FIG. 7 is a fragmetary side elevation of another embodiment of a tape cassette loading system, according to the present invention, in which a cassette holder is placed at a tape loading position but locking for retaining the cassette holder at the tape loading position is released.

When the eject button is operated while the tape cassette is set in the VTR system and the tape pulled out of the cassette casing disposed in the tape path, the tape loading mechanism is driven to unload the tape and retract the extracted tape into the cassette casing. The tape loading mechanism includes a component (not shown) which is associated with the locking lever 146. This component drives the locking lever 146 after the tape unloading operation is completed and thereby the entire length of the tape is stored in the cassette casing, in a position as shown in FIG. 7. At this position, the locking hook 154 is disengaged from the locking roller 156. Therefore, the cassette holder 102 becomes free from restriction.

Figure 8:
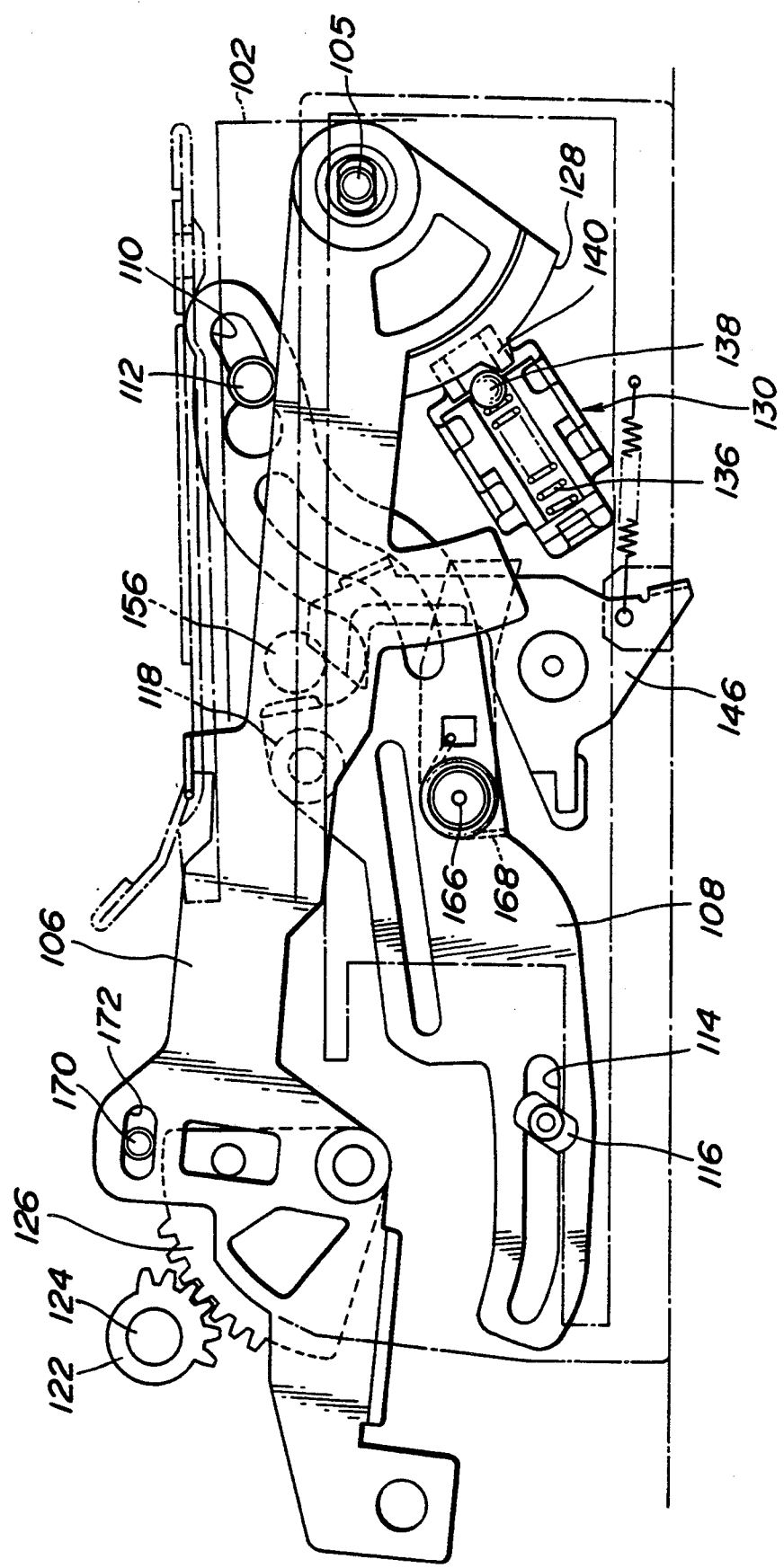
FIG. 8 is a fragmetary side elevation of another embodiment of a tape cassette loading system, according to the present invention, in which a cassette holder is placed at a tape unloading completed position.

At this condition, the resilient force of the torsion spring 118 becomes active to cause an upward movement of the cassette holder 102. By upward movement of the cassette holder 102, a connecting pin 170 which slidably engages with an transversely elongated hole 172 of the actuation lever 106, shifts upwardly to cause pivotal movement of the actuation lever about the pivot 105. According to pivotal movement of the actuation lever 106, the connecting lever 108 pivots. During pivotal movement of the actuation lever 106, the projection 140 on the cam face 128 comes into contact with the cam follower member 138, as shown in FIG. 8. Therefore, with the resilient force of the bias spring 136 of the cam follower assembly 130, the pivotal movement of the actuation lever 106 is stopped at the tape unloading completed position. At this condition, the cassette holder 102 slightly projects.

Figure 9:
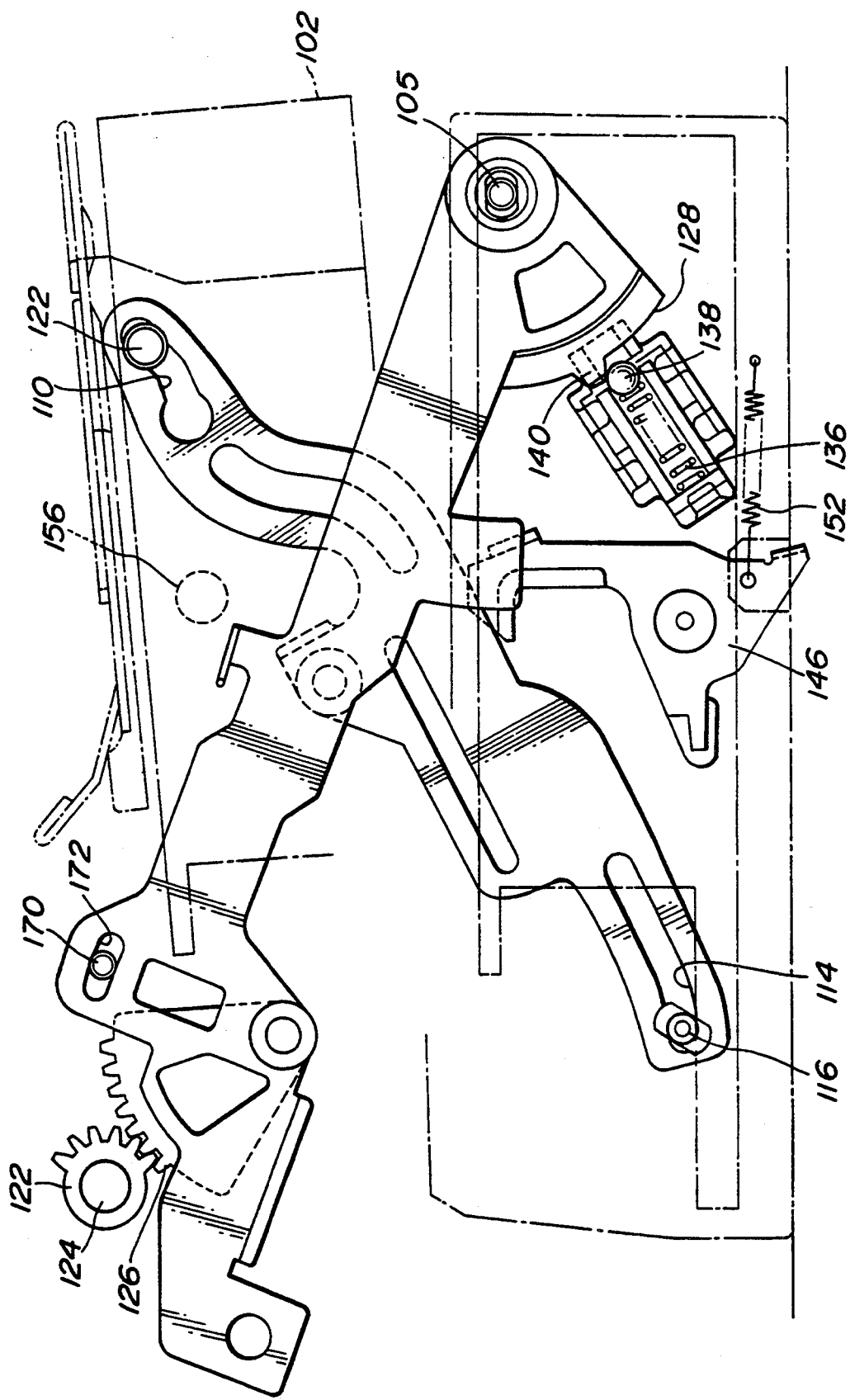
FIG. 9 is a fragmetary side elevation of another embodiment of a tape cassette loading system, according to the present invention, in which a cassette holder is placed at a tape loading position.

At this position, a user of the VTR unit may manually pull the cassette holder 102 to the eject position shown in FIG. 9.

With the constructions in the shown embodiments, tape unloading completed condition can be noticed by shifting the cassette holder from the tape loading position to the tape unloading completed position by way of cassette holder movement to the eject position. Therefore, the invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A magnetic tape cassette loading system having a mechanical chassis in which are provided a cassette tape holder capable of movement relative to a base plate of said mechanical chassis and a movable tape guide means for drawing a section of a magnetic tape from a tape cassette received in said tape cassette holder and arranging the magnetic tape in a predetermined tape path defined outside of a casing of said magnetic tape cassette, comprising:

retaining means for movably retaining said holder on said mechanical chassis of said tape cassette loading system to enable said holder to be movable through a predetermined path between a first position in which said tape guide means can draw a section of said magnetic tape from said tape cassette in said tape path, and a second position in which said cassette may be removed or inserted into said holder;

a cam defined on one of said tape cassette holder and said mechanical chassis and a cam follower defined on the other of said holder and mechanical chassis;

elastic pusher means for urging said cassette holder from said first position in the direction of said second position while maintaining said cassette holder substantially parallel to said base plate; and a first step means defined on said cam for elastically arresting movement of said holder caused by said pusher means at a third position of said holder, which third position of said holder is intermediate said first position and said second position.

2. A magnetic tape cassette loading system as set forth in claim 1 further comprising a releasable catch means for releasably retaining said cassette holder in said first position.

3. A tape cassette loading system as set forth in claim 1 wherein said retaining means of cassette holder pivotably retains said cassette holder so as to be pivotably movable between said first and said second positions.

4. A tape cassette loading system as set forth in claim 1 wherein said cam is formed integrally with said tape cassette holder and said cam follower is supported on said chassis.

5. A tape cassette loading system having a mechanical chassis in which are provided a cassette tape holder capable of movement relative to a base plate of said mechanical chassis and a movable tape guide means for drawing a section of a magnetic tape from a tape cassette received in said tape cassette holder and arranging the magnetic tape in a predetermined tape path defined outside of a casing of said magnetic tape cassette, comprising:

retaining means for movably retaining said holder on said mechanical chassis of said tape cassette loading system to enable said holder to be movable through a predetermined path between a first position in which said tape guide means can draw a section of said magnetic tape from said tape cassette in said tape path, and a second position in which said cassette may be removed or inserted into said holder;

a cam defined on one of said tape cassette holder and said mechanical chassis and a cam follower defined on the other of said holder and mechanical chassis; and a first step means defined on said cam for elastically arresting movement of said holder caused by said pusher means at a third position of said holder, which third position of said holder is intermediate said first position and said second position;

wherein said cam follower comprises a detent unit for cooperation with said cam comprising:

a detent unit casing literally formed with a pair of hook means for retaining said casing on a structural member of said tape cassette loading system;

a hollow shaft formed in said casing which opens onto a slot in said detent unit casing into which said cam may protrude;

a compression spring disposed in said shaft of said detent unit casing; and a ball bearing provided at an end of said shaft which opens onto said slot formed in said detent unit casing into which said cam may protrude.

6. The tape cassette loading system as set forth in claim 5, further comprising elastic pusher means for urging said cassette holder from said first position in the direction of said second position while maintaining said cassette holder substantially parallel to said base plate.

7. A tape cassette loading system having a mechanical chassis comprising:

a movable cassette holder associated with a movable tape guide means for drawing a section of a tape from a tape cassette received in said tape cassette holder and arranging the tape in a predetermined tape path defined outside of a cassette casing when said cassette holder is placed at a first position in which said tape guide means is accessible to said tape stored in said cassette casing, said cassette holder being movable relative to a base plate of said mechanical chassis between said first position and a second position at which said tape cassette can be set in or removed from said cassette holder, via a third position located between said first and second positions;

retaining means for movably retaining said cassette holder for movement between said first, second and third positions;

elastic pusher means for urging said cassette holder from said first position in the direction of said second position while maintaining said cassette holder substantially parallel to said base plate; and a cam defined on one of said cassette holder and said mechanical chassis and a cam follower defined on the other of said holder and said mechanical chassis, said cam limiting movement of said cassette holder for stopping at said third position on the way from said first position to said second position.

8. A tape cassette loading system as set forth in claim 7, wherein said cam comprises a resilient means generating a resilient force for restricting movement of said cassette holder at said third position.

9. A tape cassette loading system as set forth in claim 8, wherein said cam comprises means for releasing said resilient force for allowing said cassette holder to move from said third position to said second position when a force overcoming said resilient force is exerted.

10. A tape cassette loading system as set forth in claim 9, which further comprises a releasable catch means for releasably retaining said cassette holder in said first position.

11. A tape cassette loading system as set forth in claim 7 wherein said retaining means of cassette holder pivotably retains said cassette holder so as to be pivotably movable between said first and said second positions.

12. A tape cassette loading system as set forth in claim 7 wherein said cam is formed integrally with said tape cassette holder and said cam follower is supported on said chassis.

13. A tape cassette loading system as set forth in claim 7, wherein said cassette holder is movable between said first and second positions while maintaining parallelism with said base plate of said mechanical chassis.

14. The tape cassette loading system as set forth in claim 7, wherein said pusher means includes an actuation lever, said cam defining a cam face on said actuation lever, said cam follower being biased toward said cam face, and a projection from said cam face which is oriented at a position defining the angular position of the actuation lever at said third position so that said projection coacts with said cam follower to stop pivotal movement of the actuation lever at the angular position corresponding to said third position.

15. The tape cassette loading system as set forth in claim 14, wherein said actuation lever pivots to said third position so that said cassette holder slightly projects above said chassis to permit a user to manually pull the cassette holder to said second position where the cassette may be removed from or inserted into said holder.

16. The tape cassette loading system as set forth in claim 7, wherein said retaining means and said pusher means cooperate to cause said cassette holder to be shifted between said first position, said second position, and said third position wherein said cassette holder is partly open while maintaining parallelism with said base plate of said mechanical chassis.

17. The tape cassette loading system as set forth in claim 16 wherein said retaining means and said pusher means include an actuation lever pivotally mounted at about an upper front corner of said cassette holder to pivot in accordance with the movement of said cassette holder, and a connecting lever movably connected to said cassette holder and pivotally connected to said actuation lever, so that movement of said activation lever cause a shift in position of the cassette holder through said connecting lever.

18. A tape cassette loading system having a mechanical chassis comprising:

a movable cassette holder associated with a movable tape guide means for drawing a section of a tape from a tape cassette received in said tape cassette holder and arranging the tape in a predetermined tape path defined outside of a cassette casing when said cassette holder is placed at a first position in which said tape guide means is accessible to said tape stored in said cassette casing, said cassette holder being movable relative to a base plate of said mechanical chassis between said first position and a second position at which said tape cassette can be set in or removed from said cassette holder, via a third position located between said first and second positions;

retaining means for movably retaining said cassette holder for movement between said first, second and third positions; and a cam defined on one of said cassette holder and said mechanical chassis and a cam follower defined on the other of said holder and said mechanical chassis, said cam limiting movement of said cassette holder for stopping at said third position on the way from said first position to said second position;
wherein said cam comprises:
a detent unit casing integrally formed with a pair of hook means for retaining said detent unit casing on a structural member;
a hollow shaft formed in said casing which opens onto a slot in said detent unit casing into which said cam may protrude;
a compression spring disposed in said shaft of said detent unit casing; and
a ball bearing provided at an end of said shaft which opens onto said slot formed in said detent unit casing into which said cam may protrude.

19. The tape cassette loading system as set forth in claim 18, further comprising elastic pusher means for urging said cassette holder from said first position in the direction of said second position while maintaining said cassette holder substantially parallel to said base plate.

20. A tape cassette loading system having a mechanical chassis comprising:
a movable cassette holder associated with a movable tape guide means for drawing a section of a tape from a tape cassette received in said tape cassette holder and arranging the tape in a predetermined tape path defined outside of a cassette casing when said cassette holder is placed at a first position in which said tape guide means is accessible to said tape stored in said cassette casing, said cassette holder being movable relative to a base plate of said mechanical chassis between said first position and a second position at which said tape cassette can be set in or removed from said cassette holder, via a third position located between said first and second positions;
retaining means for movably retaining said cassette holder for movement between said first, second and third positions; and
a cam defined on one of said cassette holder and said mechanical chassis and a cam follower defined on the other of said holder and said mechanical chassis, said cam limiting movement of said cassette holder for stopping at said third position on the way from said first position to said second position;
wherein said cam follower comprises a detent unit for cooperation with said cam comprising:
a detent unit casing integrally formed with a pair of hook means for retaining said detent unit casing on a structural member of said tape cassette loading system;
a hollow shaft formed in said casing which opens onto a slot in said detent unit casing into which said cam may protrude;
a compression spring disposed in said shaft of said detent unit casing; and
a ball bearing provided at an end of said shaft which opens onto said slot formed in said detent unit casing into which said cam may protrude.

21. The tape cassette loading system as set forth in claim 20, further comprising elastic pusher means for urging said cassette holder from said first position in the direction of said second position while maintaining said cassette holder substantially parallel to said base plate.

* * * * *